United States Patent
Primot et al.

(10) Patent No.: US 7,864,340 B2
(45) Date of Patent: Jan. 4, 2011

(54) WAVEFRONT ANALYSIS METHOD INVOLVING MULTILATERAL INTERFEROMETRY WITH FREQUENCY DIFFERENCE

(75) Inventors: Jerome Primot, Chatillon (FR); Sabrina Velghe, Villebon-sur-Yvette (FR); Nicolas Guerineau, Antony (FR); Riad Haidar, Paris (FR); Michel Tauvy, Montigny le Bretonneux (FR)

(73) Assignee: ONERA (Office National d/Etudes et de Recherches Aerospatiales, Chatillon (FR)

( * ) Notice: Subject to any disclaimer, the term of this patent is extended or adjusted under 35 U.S.C. 154(b) by 39 days.

(21) Appl. No.: 12/221,883

(22) Filed: Aug. 7, 2008

(65) Prior Publication Data

US 2009/0051928 A1 Feb. 26, 2009

Related U.S. Application Data

(63) Continuation of application No. PCT/FR2007/050810, filed on Feb. 15, 2007.

(30) Foreign Application Priority Data

Feb. 16, 2006 (FR) .................................. 06 01362

(51) Int. Cl.
G01B 9/02 (2006.01)
(52) U.S. Cl. .................................................. 356/521
(58) Field of Classification Search ................. 356/451, 356/488, 499, 512, 521
See application file for complete search history.

(56) References Cited

U.S. PATENT DOCUMENTS

| 4,832,489 | A | | 5/1989 | Wyant | |
|---|---|---|---|---|---|
| 5,606,417 | A | * | 2/1997 | Primot et al. | 356/515 |
| 5,671,050 | A | * | 9/1997 | de Groot | 356/497 |
| 5,995,224 | A | * | 11/1999 | de Groot | 356/511 |
| 6,072,581 | A | * | 6/2000 | Stephenson et al. | 356/521 |
| 6,304,330 | B1 | | 10/2001 | Millerd | |
| 6,577,403 | B1 | * | 6/2003 | Primot et al. | 356/521 |
| 6,734,978 | B2 | * | 5/2004 | Adachi | 356/512 |
| 6,785,001 | B2 | * | 8/2004 | Almarzouk et al. | 356/450 |
| 6,853,942 | B2 | * | 2/2005 | Drege et al. | 702/119 |
| 6,888,639 | B2 | * | 5/2005 | Goebel et al. | 356/504 |
| 7,599,071 | B2 | * | 10/2009 | Dillon et al. | 356/521 |
| 7,609,388 | B2 | * | 10/2009 | Arieli et al. | 356/512 |

(Continued)

FOREIGN PATENT DOCUMENTS

EP  1 505 365 A2  12/2005

(Continued)

OTHER PUBLICATIONS

"Lateral Shearing Interferometers" by M. V. Mantravadi, Optical Shop Testing, Second Edition, 1992, John Wiley & Sons, Inc.

*Primary Examiner*—Gregory J Toatley
*Assistant Examiner*—Scott M Richey
(74) *Attorney, Agent, or Firm*—Lawrence E. Laubscher, Sr.; Lawrence E. Laubscher, Jr.

(57) ABSTRACT

The method comprises positioning a diffraction grating with a two-dimensional meshing on the path of the beam to be analyzed and processing at least two interferograms of at least two different colors, each interferogram being obtained in a plane from two sub-beams with different diffraction orders. The invention can be used to analyze and correct divided wavefronts.

8 Claims, 4 Drawing Sheets

U.S. PATENT DOCUMENTS

| | | | |
|---|---|---|---|
| 7,751,063 B2 * | 7/2010 | Dillon et al. | 356/511 |
| 2007/0091315 A1 * | 4/2007 | Brady et al. | 356/451 |
| 2009/0073450 A1 * | 3/2009 | Boyd et al. | 356/454 |

FOREIGN PATENT DOCUMENTS

| | | |
|---|---|---|
| FR | 2 682 761 | 4/1993 |
| FR | 2 712 978 | 6/1995 |
| FR | 2 795 175 | 12/2000 |

* cited by examiner

WAVEFRONT ANALYSIS METHOD INVOLVING MULTILATERAL INTERFEROMETRY WITH FREQUENCY DIFFERENCE

REFERENCE TO RELATED APPLICATIONS

The present application is a continuation of the PCT International Application No. PCT/FR2007/050810 filed Feb. 15, 2007, which is based on the French Application No. 0601362 filed Feb. 16, 2006.

BACKGROUND OF THE INVENTION

1. Field of the Invention

This invention relates to the analysis of the wavefront of a light beam.

2. Description of the Prior Art

Such a type of analysis makes it possible to test optical elements, as well as to qualify optical devices. It also allows for the study of non-directly measurable physical phenomena, such as optical index variations within turbulent media that can be encountered when crossing the earth atmosphere, as well as in a blowing vein. Numerous other applications could be contemplated such as metrology and the control of traditional or intense lasers.

The type of analysis of a wavefront according to this invention is based on the use of a diffraction grating positioned on the path of the beam to be analyzed.

For a better understanding of the following, such a grating is defined as being an optical system introducing periodic phase and intensity variations. Any grating is thus characterized by the multiplication of two functions: the one, referred to as phase function, represents the periodical phase variations introduced by the grating and the other one, referred to as intensity function, represents periodical intensity variations introduced by the grating.

In accordance to French patent 2 712 978, the Applicant reminds the mode of constitution and the definition of a two-dimensional grating. A set of points regularly arranged according to two directions constitutes a planar meshing. Such points define an elementary meshing. The elementary mesh is the smallest surface allowing one to achieve a non-lacunary paving of the plane. The polygon of the elementary mesh is the minimum surface polygon having the sides thereof supported by mediatrices of the segments connecting any point of the set to its nearest neighbors. A two-dimensional grating is the free repetition of an elementary pattern arranged according to a planar meshing. A planar meshing can define elementary meshes, being either hexagonal or rectangular (square meshes being only a special case for the latter).

When a diffraction grating is being illuminated with a light beam, referred to as an incident beam, the light beams being diffracted by the grating could be described as replicas of the incident beam. These beams are called sub-beams, each one corresponding to a diffraction order of the grating.

A particular optical processing of the thereby obtained sub-beams makes it possible to observe an interferogram (the interference image) made of a periodical meshing of light spots. If the incident wavefront is planar, the interferogram resulting from the interference of the sub-beams is referred to as an original interferogram. If the incident wavefront is not planar, the interferogram displays deformations with respect to an original interferogram; it is referred to as the deformed interferogram. Deformations of the deformed interferogram are sensitive to the increase rates of the wavefront.

The difference in level at one point $P(x, y, z)$ of a surface S, $d_{u,d}(P)$, is defined as being the difference in height $z'$ between two points, located on either side of point P, separated with a distance d along a direction u. As used therein, a difference in level of a surface along the direction u and at a distance d then means the set of points $P'$ $(x, y, z')$ resulting from the function $d_{u,d}(P)$ applied to all points P of this surface. The set of points $P'$ defines a new surface, denoted $S'$.

The increase rate at one point $P(x, y, z)$ of a surface S, $t_{u,d}(P)$, is defined as being the difference in level of $d_{u,d}(P)$ obtained at such a point P divided by the distance d. The increase rate of a surface along the direction u and at a distance d is then used to mean the set of points $P''$ $(x, y, z'/d)$ resulting from the function $t_{u,d}(P)$ applied to all points P of this surface. This set of points $P''$ defines a new surface, designated $S''$. When the surface S is continuous and if the distance d tends towards 0, then the surface $S''$ tends towards the gradient of S along the direction u. It is possible to find a sufficiently small distance d from which the increase rate of a continuous surface is very close to the gradient. In such a case, the gradient and the increase rate are assimilated.

In the field of the analysis of a wavefront, assimilating the increase rate to the gradient is very common (D. Malacara, "Optical Shop Testing", Wiley-Interscience, 2nd Edition, pages 126-127).

For analyzing a wavefront, there is known a analyzer, referred to as the "Shack-Hartmann" analyzer, described in "Phase measurements systems for adaptive optics", J. C. Wyant, AGARD Conf. Proc., No. 300, 1981. The general principle consists in optically conjugating the phase defect to be analyzed with a grid of micro-lenses. In the common plane of the micro-lens focuses, an intensity pattern comprising a deformed grating of spots as a function of the increase rate of the wavefront can be observed. An interpretation based on a subdivision into sub-beams diffracted by the micro-lens network has been developed in "Theoretical description of Shack-Hartmann wave-front sensor", J. Primot, Optics Communications, 2003.

The so-called "Shack-Hartmann" wavefront analyzers have this advantage to operate with color beams. The color of a beam is defined as being a mix of monochromatic radiations of different wavelengths in fixed proportions. A monochromatic radiation should thus be considered as a particular color.

The light output of such analyzers is close to the maximum; in contrast, the sensitivity and the dynamics are only controllable by changing the micro-lens grid.

There are also known wavefront interferometric analyzers of the phase changing type, referred to as "phase-shifting" type, described in "Optical Shop Testing", D. Malacara, Wiley-Interscience, $2^{nd}$ Edition, chapter 14. The phase-shifting interferometry technique consists in temporally or spatially adding a known phase shift on one of the arms so as to determine the increase rate of a wavefront from several interferograms. Such a device, generally based on a Michelson type interferometer, is chromatic and can only simultaneously implement one single wavelength. It is however possible to successively use several wavelengths, as described in the above-mentioned work (page 560), so as to take profit of a larger measurement dynamics, and also to get rid of intensity offset errors in the light beams. A system combining a spatial phase-shifting interferometer and a two-wavelength measurement is described in the European patent 1 505 365.

In French patent applications 2 712 978 and 2 795 175, the Applicant described in particular three-wave and four-wave lateral shearing interferometers based on a diffraction grating and belonging to the family of shearing interferometers, a family distinct from the phase-shifting interferometers, and being the object of a description in chapter 4 of the above-mentioned work ("Optical Shop Testing", D. Malacara, Wiley-Interscience, 2nd Edition, chapter 4).

According to the approach by splitting into sub-beams, the three-wave and four-wave lateral shearing interferometers, the diffraction grating optically splits the beam to be analyzed into three (three-wave lateral) or four (four-wave lateral) sub-beams.

A particular optical processing of thereby obtained sub-beams makes it possible to observe a interferogram comprising a periodic meshing of light spots and sensitive to increase rates of the wavefront.

In both above-mentioned patents of the Applicant, it is stated that such a result depends on the gradient, the situation being similar to the increase rate in the case of a continuous wavefront.

Analyzing increase rates can only occur with a possibility of continuous adjustment of the dynamics and the sensitivity. It is also possible to estimate the measurement error starting from the measurement itself; finally, the resulting interferogram is particularly adapted for analysis techniques based on Fourier transforms, providing it with simplicity and ease of implementation by computing means. Similarly as the Shack-Hartmann interferometer, such interferometers can operate with color beams and their light outputs are high.

Recently, new needs in the field of optics control have arisen. Increasingly high requirements in terms of radiometric sensitivity or spatial resolution result in achieving very large diameter optics made by applying elementary optics of a smaller size according to a Cartesian or hexagonal meshing. This is referred to as segmented optics. One well known example is the Keck telescope formed by applying thirty-six hexagonal elements. Such new optical systems require an adapted controlling means allowing for shaping the overall surface, i.e. the accurate positioning of the different segments so as to bring them all on one single surface.

On the other hand, opticians more and more often make use of so-called diffractive optical components, comprising alternated planar areas of different sizes and of different heights. These make it possible to implement optical functions similar to traditional components such as lenses and prisms, but with specific characteristics, in particular in the field of chromatics. Because of their particular shapes, such elements require adapted characterization means.

The common point of those two examples of application is the need to analyze a divided surface in order to map the position and height transitions, so as to determine the values thereof and/or to modify them, or to simply check them.

In the following, the expression "a divided surface" will be used for meaning the discontinuous application of surface parts, with possibly different sizes, with possibly voids between the parts and having differences in level between parts. As the divided surfaces are not continuous, the resulting surface of an increase rate operation could not be assimilated to the gradient.

The planar wavefront as reflected by a segmented mirror, the elementary segments of which have not been repositioned, or transmitted by a diffractive element such as above defined, are divided wavefronts. Those two examples of application thus show the interest of developing an analyzing means for a wavefront adapted for such new needs.

In the usual usage mode, the so-called "Shack-Hartmann" wavefront analyzers do not allow to analyze divided wavefronts.

J. C. Chanteloup, in the article "Multiple-wave lateral shearing interferometry for wave-front sensing", Appl. Opt. 44, page 1559-1571 (2005) experimentally reported that three-wave and four-wave lateral shearing interferometers allowed for the analysis of divided surfaces having small difference in level with respect to the analysis wavelength. Analyzing divided wavefronts with differences in level higher than the analysis wavelength gives the correct position of the differences in level, but their height is undetermined as it is given at the nearest wavelength. Such a limitation is prohibitory for the above-mentioned applications.

SUMMARY OF THE INVENTION

It thus seems highly desirable to have available an analyzer allowing for divided wavefronts to be analyzed without any limitation on the amplitude of such differences in level between parts. The present invention relying on the use of a two-dimensional diffraction grating has for an object to provide an improvement in this respect.

A two-dimensional diffraction grating makes it possible to observe in an observation plane an interferogram characterizing the wavefront of the beam to be analyzed.

The observed interferogram is considered according to the invention as the combination of elementary interferograms. It is always possible to subdivide an interferogram into a series of elementary interferograms through a Fourier transform for example.

Each sub-beam from the grating propagates along the particular direction of its diffraction order. It is then possible to form sub-beam pairs, each sub-beam of the pair having a different order.

Sub-beams of a pair propagate along the two directions of the diffracted orders and are shifted during the propagation. Such a shift in the observation plane is referred to as lateral shearing. Each elementary interferogram results from the interference of the set of sub-beam pairs from the diffraction grating having one single lateral shearing along one single direction in the observation plane. The pairs having one single lateral shearing along one single direction in the observation plane are so-called iso-shifted pairs. The sub-beams of all the iso-shifted pairs are rocked one relative to the other with one single angle, referred to as the privileged rocking angle.

The intensity profile of an elementary interferogram consists in quasi-rectilinear fringes, the perpendicular direction of which in the observation plane is called privileged direction.

If the wavefront of the incident wave is planar, the interferogram resulting from the interference of sub-beams is called the original interferogram and the elementary interferograms are so-called original. Each of the elementary interferograms resulting from the interference of the set of pairs of iso-shifted sub-beams then displays a purely sinusoidal intensity profile according to the privileged direction and the period p of which depends on the privileged rocking angle. If the wavefront of the incident wave is not planar, the interferogram is submitted to deformations and is called a deformed interferogram and the elementary interferograms are so-called deformed. The deformations depend on the increase rates of the incident wavefront according to the privileged directions and the lateral shears of all present pairs of sub-beams.

As it is possible, using a wavefront analyzer based on a diffraction grating, to analyze a wavefront, including a divided wavefront, from elementary interferograms, a monochromatic wave is considered with an incident wavefront to be analyzed on a one-dimensional grating diffracting two orders.

The wave is diffracted into two sub-beams propagating according to the directions of the two orders diffracted by the grating. The interferograms observed as resulting from the interference of those two replicas at a given distance of the grating.

If the incident wave has a wavefront with two parts with a difference in level of height h, the intensity profile of the deformed elementary interferogram is of the same type as that of the original elementary interferogram, but has two discontinuities bounding the increase rate area and between which a fragment of the original sinusoid has been spatially translated.

The width of the fragment is equal to the lateral shear between the two sub-beams of the pair under study at the observation distance. The spatial translation shift $s_i$ of the intensity profile with respect to that of the original elementary interferogram is linked to the period p of the sinusoid, to the analysis wavelength $\lambda_i$ and to the height h of the difference in level, via the relationship:

$$s_i = \frac{hp}{\lambda_i} - \left[\text{Integeal part}\left(\frac{h}{\lambda_i}\right)\right]p. \qquad (1)$$

The value of $s_i$ therefore lies between 0 and p. Such a relationship shows that the dynamics of the monochromatic analysis of differences in level of the wavefront is limited to the analysis wavelength. The dynamics of a difference in level of the wavefront is defined as the deviation between the maximum value and the minimum value of such a difference in level. In particular, analyzing the difference in level of a wavefront only having two segments separated with a height h higher than $\lambda_i$ gives an ambiguous result as it is at the nearest $\lambda_i$:

$$h = \frac{\lambda_i s_i}{p}, \text{ modulo } (\lambda_i). \qquad (1b)$$

If two measurements are considered, being obtained for two wavelengths $\lambda_1$ and $\lambda_2$ with $\lambda_2$ being higher, the two interferograms deformed by the wavefront can be processed together. To this end, the translation shift s between the intensity profile of the first deformed elementary interferogram and the intensity profile of the second deformed elementary interferogram is measured and defined by:

$$s = s_1 - s_2 = hp\left(\frac{1}{\lambda_1} - \frac{1}{\lambda_2}\right) \qquad (2)$$

where $s_1$ and $s_2$ are the translation shifts of the sinusoidal intensity profile at the two wavelengths $\lambda_1$ and $\lambda_2$.

It then becomes possible to analyze the differences in level of the wavefront with a dynamics higher than $\lambda_i$ and to define them with no ambiguity on a much more significant measurement range being able to be adapted, if necessary. Indeed, through analogy with the equation (1), it is possible to measure, without any ambiguity, differences in level having a dynamics lower than $\lambda_{eq}$, with:

$$\lambda_{eq} = \frac{1}{\frac{1}{\lambda_1} - \frac{1}{\lambda_2}} \qquad 3)$$

As the increase rates of a wavefront are proportional to the differences in level, while selecting $\lambda_2$ sufficiently close to $\lambda_1$, it thus becomes possible to measure the increase rates whatever their amplitudes.

Such a method can be generalized to plural pairs of sub-beams and to any divided wavefront, to more than two parts and with different heights between each of the parts, provided the dynamics of differences in level is lower than $\lambda_{eq}$.

Thus, increase rates of the incident wavefront can be obtained according to the privileged directions and the lateral shears of the set of pairs of iso-shifted sub-beams.

A processing based on a recombination of such increase rates could then be carried out in order to rebuild the original wavefront.

This invention has been described above with monochromatic beams. This description is not limitative and can be generalized to beams with two different colors.

It is also possible to implement more than two colors, so as to obtain amplitude dynamics and sensitivities adapted for different increase rate amplitudes.

The object of the invention is thus to provide a method for analyzing a wavefront of a light beam, wherein:

(a) a diffraction grating (GR) with a two-dimensional meshing is positioned in one plane ($P_c$) on the path of the beam to cause the beam to be diffracted into different sub-beams due to at least two diffraction orders;

(b) there are created and observed in planes ($P_s$) parallel to the plane ($P_C$) of the grating (GR) at least two interferograms formed by the interference of at least one pair of iso-shifted sub-beams, each interferogram being implemented with a different color;

(c) the at least two interferograms of different colors are processed for deriving from them at least one increase rate in order to analyze the wavefront.

The interferogram deformed by the increase rates of the incident wavefront can be seen as the result of a phase modulation operation on the original interferogram. A demodulation processing can then be carried out so as to find the increase rates.

It is possible to explain such modulation and demodulation operations on the basis of the telecommunications field.

In the telecommunications field, phase modulation is a very common method for transmitting information (or modulating signal). A carrier signal is submitted to deformations linked to the modulating signal by a phase modulation operation. The new signal, which will be transmitted, is referred to as a modulated signal. In order to find the modulating signal, a traditional demodulation technique consists in considering the instantaneous phase of the modulated signal and comparing it to the instantaneous phase of a reference signal, in this case, the carrier signal.

If the wavefront of the incident wave is planar, two original elementary interferograms, each resulting from the interference of a set of pairs of iso-shifted sub-beams with two different colors show a purely sinusoidal modulation according to the privileged direction. The result of the demodulation is a constant signal showing the absence of variation of the instantaneous phase and consequently the planarity of the wavefront.

The analogy with telecommunications, in the particular case of the use of sinusoidal signals, can then be carried out considering a pair of sub-beams separately. The elementary interferogram corresponding to such pair and a given color can be considered as a carrier signal. The elementary interferogram corresponding to the same pair, but with another color can be considered as the modulated signal to be demodulated. The increase rate, according to the privileged direction and the lateral shear of the pair under study, is then the modulating signal to be found. The demodulation operation, occurring here in the spatial field, then consists in considering the local phase of the elementary interferogram with one color and then comparing it to the local phase of the elementary interferogram with another color.

Such a spatial demodulation operation can occur as many times as there are sets of pairs of iso-shifted sub-beams. Thus, increase rates of the incident wavefront can be obtained according to the privileged directions and the lateral shears of each of the sets of pairs of iso-shifted sub-beams. The thus obtained different increase rates can then be combined for rebuilding the incident wavefront.

Advantageously, it can be considered that the at least two interferograms, formed by the interference of at least one pair of two iso-shifted sub-beams, display modulations and that the processing of said at least two interferograms is a demodulation of an interferogram considering as the reference modulation the other interferogram so as to derive at least one increase rate.

The processing of interferograms can also consist in calculating the difference of the translation shifts between the two interferograms by the calculation of the position of barycentres of the light spots or by the local measurement of the position of their maxima.

During the processing, the increase rates are obtained in at least two different privileged directions and are combined so as to rebuild the wavefront.

According to an alternative, the two-dimensional diffraction grating (GR) allows for extracting three sub-beams, the observation of which in a distant field forms three spots positioned according to an isosceles triangle, thereby defining three privileged directions, so as to rebuild the wavefront and estimate the error on the measurement from the measurement itself.

In another alternative, the grating (GR) allows for extracting four sub-beams, the observation of which in a distant field forms four spots positioned according to a rectangle.

It is desirable that the observation planes ($P_s$) are all confused in one common observation plane and/or that this common observation plane ($P_s$) is optically conjugated with the divided wavefront to be analyzed.

BRIEF DESCRIPTION OF THE DRAWINGS

Other objects and advantages of the invention will become apparent from a study of the following specification, when viewed in the light of the accompanying drawings, in which.

DETAILED DESCRIPTION

Figure 1:
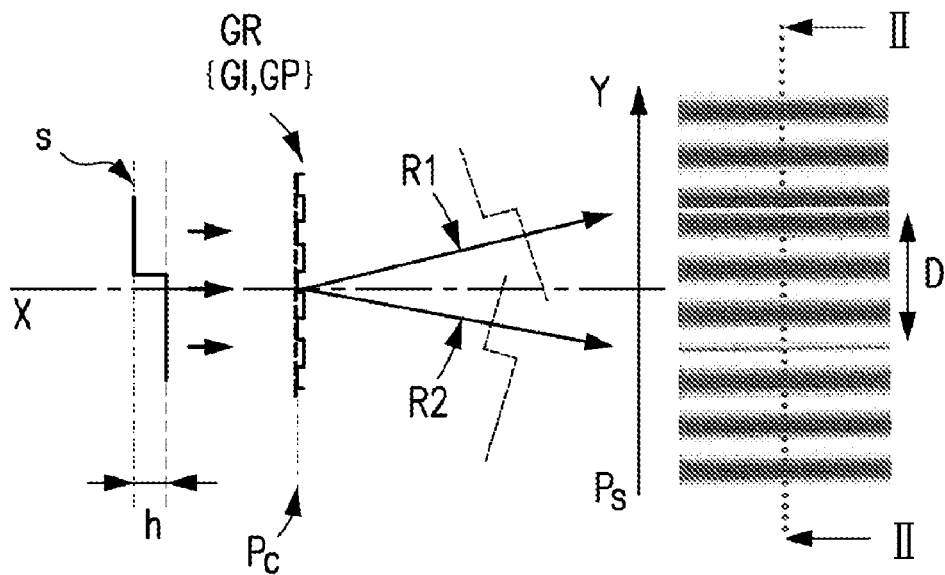
FIG. 1 illustrates the general principle of the measurement of a divided wavefront S with two parts emphasizing the area linked to the increase rate on the interferogram.

On FIG. 1, in order to illustrate, as simply as possible, the present invention, the incident beam with a wavelength $\lambda_i$ propagating according to the axis X has a wavefront S with two parts having a difference in level with a height h. The two-dimensional grating GR is positioned in a plane $P_c$ preferably perpendicular to the axis X.

Still with a view to simplification, only one pair of sub-beams is taken into consideration. The sub-beams propagate according to the two particular directions R1 and R2, corresponding to two different orders of diffraction, forming therebetween the privileged rocking angle and defining, in the observation plane $P_s$, the lateral shear D. The plane $P_s$ is parallel to the plane $P_c$ and it thus in turn preferably perpendicular to the axis X.

Thus, the interferogram observed in the plane $P_s$ is an elementary interferogram comprising quasi-rectilinear fringes, perpendicular to the direction Y, referred to as the privileged direction.

As the wavefront of the incident beam is not planar, the interferogram is submitted to deformations resulting in two discontinuities distant from the lateral shear and restricting the area of the increase rate.

Figure 2:
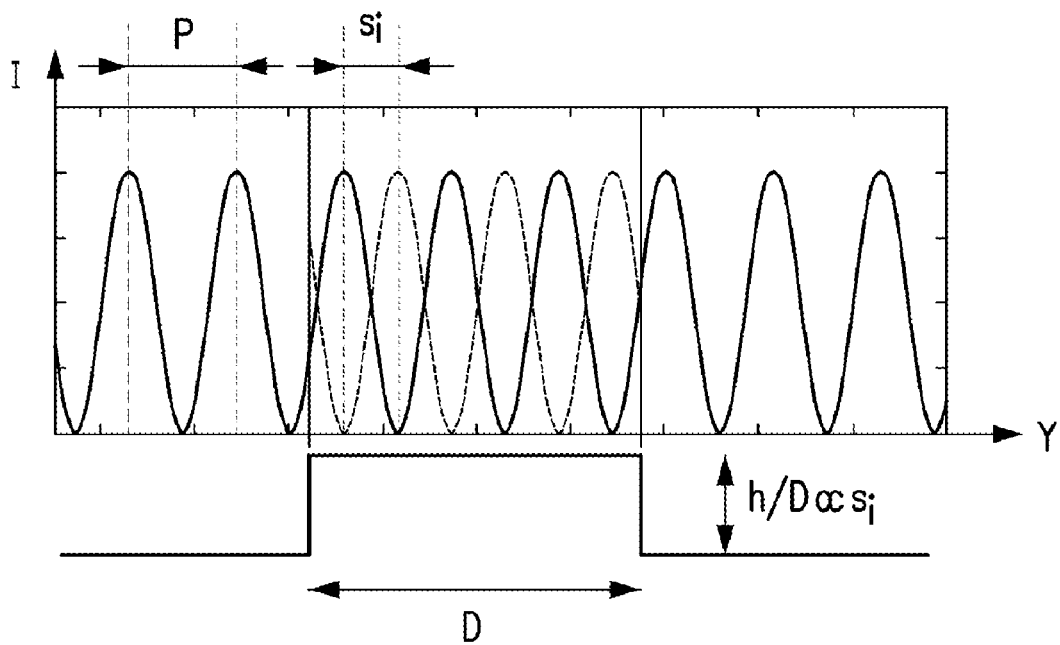
FIG. 2 is a sectional view of the interferogram taken along line II-II of FIG. 1 according to the privileged direction II overlapping that of a planar surface.

FIG. 2 shows the overlap of intensity profiles of two elementary interferograms for one single wavelength $\lambda_i$ according to the privileged direction.

The first one, in solid lines, is that corresponding to an incident beam having a planar wavefront. The intensity profile is purely sinusoidal with a period p along the privileged direction.

The second one, in broken lines, is that corresponding to the incident beam in FIG. 1. The three visible areas on the interferogram on FIG. 1 are present.

In the two areas located on either side of the increase rate area, the intensity profiles overlap. This shows the result of the increase rate operation. On either side of the lateral shear, the result of the operation is null, as the analyzed wavefronts are either entirely planar, or planar on either side of the difference in level.

On contrast, in the central area D, the intensity profile of the interferogram resulting from the divided wavefront has a shift resulting in a spatial translation At the level of the discontinuities, there appears a sudden phase jump similar to the waveforms encountered in telecommunications in phase modulation techniques. In this area D, the result of the increase rate operation is not null, as indicated on the curve at the bottom of FIG. 2.

The increase rate value in this area equals h/D. Such a value is proportional to the spatial translation $s_i$, having the following value:

$$s_i = \frac{hp}{\lambda_i} - \left[\text{Integeal part}\left(\frac{h}{\lambda_i}\right)\right]p$$

Such a relationship shows that the dynamics of the monochromatic analysis of differences in level of the wavefront is limited to the analysis wavelength.

In particular, analyzing the difference in level of a wavefront only having two segments separated with a height h higher than $\lambda_i$ gives an ambiguous result as it is at the nearest $\lambda_i$:

$$h = \frac{\lambda_i s_i}{p}, \text{ modulo } (\lambda_i)$$

For considerably increasing the value of such an ambiguity length, it is contemplated, in this invention, carrying out a double measurement. Such a double measurement is carried out only modifying the frequency of the incident radiation between two measurements, the other measuring conditions remaining identical.

Figure 3:
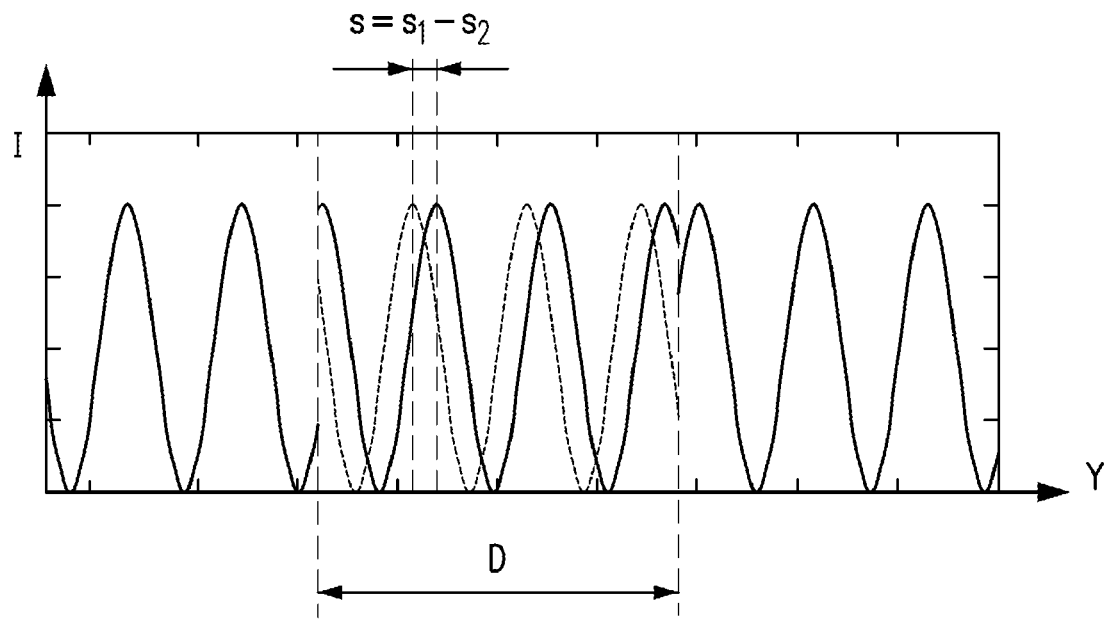
FIG. 3 shows the overlap of two sectional views of the interferogram on FIG. 1 according to the privileged direction with two different colors.

FIG. 3 shows the overlap of the intensity profiles of two elementary interferograms at two wavelengths $\lambda_1$ et and $\lambda_2$ along the privileged direction obtained with the divided wavefront on FIG. 1.

In the two areas located on either side of the increase rate area, the intensity profiles overlap. As previously, this shows the result of the increase rate operation.

The localization of each increase rate area depending on propagation directions R1 and R2 and these directions possibly being a function of the wavelength of the incident beam, the lateral shear areas are not necessarily identical, however, they define a common central area with lateral shears.

On either side of lateral shear areas, the result of the increase rate operation is null, as the wavefront to be analyzed is planar on either side of the difference in level.

On contrast, in the central area common to the shears, the intensity profiles of the interferograms resulting from the divided wavefront have a relative spatial translation s due to spatial translations $s_1$ and $s_2$.

This relative spatial translation s is derived from the difference in spatial translations for the two wavelengths. The spatial translation s has the following value:

$$s = s_1 - s_2 = hp\left(\frac{1}{\lambda_1} - \frac{1}{\lambda_2}\right)$$

It then becomes possible to analyze the differences in level of the wavefront with a dynamics higher than $\lambda_i$ and to define them without any ambiguity on a much more significant measurement range being able to be adapted, if necessary. Indeed, through analogy with the equation (1), it is possible to measure, without any ambiguity, differences in level having a dynamics lower than $\lambda_{eq}$, with:

$$\lambda_{eq} = \frac{1}{\frac{1}{\lambda_1} - \frac{1}{\lambda_2}} \quad (3)$$

As the increase rates of a wavefront are proportional to the differences in level, while selecting $\lambda_2$ sufficiently close to $\lambda_1$, it thus becomes possible to measure the increase rates whatever their amplitudes.

Such a method, didactically applied, to elementary interferograms can be generalized and applied to interferograms obtained under more realistic conditions.

The method can be generalized to plural pairs of sub-beams as the set of pairs of sub-beams having one single lateral shear according to one single direction in the observation plane. These pairs of sub-beams are referred to as iso-shifted pairs.

The method can be generalized to plural sets of iso-shifted pairs, the privileged directions of each set being different.

Similarly, generalizing this method can relate to the nature of the divided wavefront that can possibly have more than two parts having differences in level of different heights between each of the parts, providing the dynamics of differences in level is lower than $\lambda_{eq}$. The incident radiation can be a mix of monochromatic radiations with different wavelengths, in fixed proportions. The number of colors used for the measurement can be higher than two so as to obtain amplitude dynamics and sensitivities adapted for different increase rate amplitudes.

Thus, after having created, under the required conditions, the at least two interferograms necessary for the method of this invention, it is better, in a last step, to process them so as to analyze the wavefront.

In the French patent 2 682 761, the Applicant provides a technique for analyzing the resulting interference images, in order to access the gradients of the wavefront. This technique is directly applicable to the deformed interferograms according to the present invention.

This technique is based on the analysis of the spectrum of the interferogram, obtained by a Fourier transform. This spectrum comprises a fundamental and a certain number of harmonics, designated by q(i). Each pair of harmonics results from the interference of a set of pairs of iso-shifted sub-beams. A harmonics contains information on the increase rate of the wavefront along the privileged direction and the lateral shear of iso-shifted pairs having created the subject harmonics. The Fourier transform of an harmonics q(i) gives a complex amount, designated f(i). A processing, referred to as a restitution processing, is then applied to f(i) in order to obtain the increase rate.

In the article "Three-wave lateral shearing interferometer", (J. Primot, Applied Optics, vol. 32, No. 31, 1 Nov. 1993), it is suggested to take into consideration the mounting aberrations by recording a reference interferogram, obtained in the absence of the wavefront defect to be analyzed. Harmonic signals q'(i) are then calculated from this second interferogram. In order to obtain the increase rate without the mounting aberrations according to the privileged direction and the lateral shear of the $i^{th}$ set of iso-shifted pairs, the restitution processing is applied to f(i) multiplied by the conjugated amount of f'(i), where f'(i) is the Fourier transform of q'(i). Such a method therefore allows for measuring the wavefront with respect to a reference measurement.

For obtaining a dynamics of differences in level equal to $\lambda_{eq}$, the interferogram obtained with $\lambda_1$ can be analyzed using as a reference the interferogram obtained with $\lambda_2$ similarly as that adapted for subtracting the mounting aberrations. In this case, the interferogram obtained without the defect to be analyzed is substituted by the interferogram obtained with $\lambda_2$. The amount obtained at the end of such a restitution processing is then the increase rate at closest $\lambda_{eq}/D$, where D is the size of the common central area of the lateral shears.

Other procedures can be applied to interferograms. For example, studying the two interferograms obtained with $\lambda_1$ and $\lambda_2$ results in two ambiguous wavefronts as the dynamics of differences in level is respectively limited to $\lambda_1$ and $\lambda_2$. It is possible to overcome this limitation in order to obtain a dynamics increased up to $\lambda_{eq}$ by one comparison algorithm such as the one proposed by M. Löfdahl and H. Eriksson in "Resolving Piston ambiguities when phasing a segmented mirror", Proceeding of SPIE, 2000.

This technique can be applied in cases where the wavefronts to be studied only have planar segments. In this case, it is sufficient to only apply the algorithm in one segment point, being faster than an overall processing of the wavefront.

Or still, through analogy, in the telecommunications field, the phase modulation is a very common method for transmitting information (or modulating signal). A carrier signal is submitted to deformations linked to the modulating signal by a phase modulation operation. The new signal, which will be transmitted, is referred to as a modulated signal. In order to find the modulating signal, a traditional demodulation technique consists in considering the instantaneous phase of the modulated signal and comparing it to the instantaneous phase of a reference signal, in this case the carrier signal.

If the wavefront of the incident wave is planar, two original elementary interferograms, each one resulting from the interference of a set of pairs of iso-shifted sub-beams with two different colors show a purely sinusoidal modulation along the privileged direction. The result of the demodulation is a constant signal showing the absence of variation of the instantaneous phase and consequently the planarity of the wavefront.

The analogy with telecommunications, in the particular case of the use of sinusoidal signals, can then be carried out considering a pair of sub-beams separately. The elementary interferogram corresponding to such given pair and color could be considered as a carrier signal. The elementary interferogram corresponding to the same pair, but with another color can be considered as the modulated signal to be demodulated. The increase rate, according to the privileged direction and the lateral shear of the pair under study, is then the modulating signal to be found. The demodulation operation, occurring here in the spatial field, then consists in considering the local phase of the elementary interferogram with one color and then comparing it to the local phase of the elementary interferogram with another color.

Such a spatial demodulation operation can occur as many times as there are sets of pairs of iso-shifted sub-beams. Thus, increase rates of the incident wavefront can be obtained according to the privileged directions and the lateral shears of each of the sets of pairs of iso-shifted sub-beams. The thus obtained different increase rates can then be combined for rebuilding the incident wavefront.

Advantageously, it can be considered that the at least two interferograms, formed by the interference of at least one pair of two iso-shifted sub-beams, display modulations and that the processing of said at least two interferograms is a demodulation of an interferogram considering as reference modulation the other interferogram so as to derive at least one increase rate.

In order to fully take advantage of the method and to directly rebuild the wavefront to be analyzed, it is preferable, during the processing, that the increase rates be obtained in at least two different privileged directions and be combined.

According to an alternative, the two-dimensional diffraction grating (GR) allows for extracting three sub-beams, the observation of which in a distant field forms three spots positioned according to an isosceles triangle, thereby defining three privileged directions, so as to rebuild the wavefront and estimate the error on the measurement from the measurement itself according to the teachings from French patent 2 682 761.

In another alternative, the grating (GR) allows extracting four sub-beams, the observation of which in a distant field forms four spots positioned according to a rectangle.

In the case of a wavefront having continuous deformations, it is shown in French patent 2 682 761 that the dynamics and the sensitivity of the device vary depending on the distance z, in particular, if the plane $P_C$ is confused with the plane $P_S$, the sensitivity is null. On contrast, in the case of transitions of a divided wavefront, the height of the increase rate weighted with the lateral shear is independent from the distance z, the dynamics and the sensitivity of the device are thus constant whatever z is not null.

It is thus desirable that observation planes ($P_s$) be merged into one common observation plane.

Figure 4:
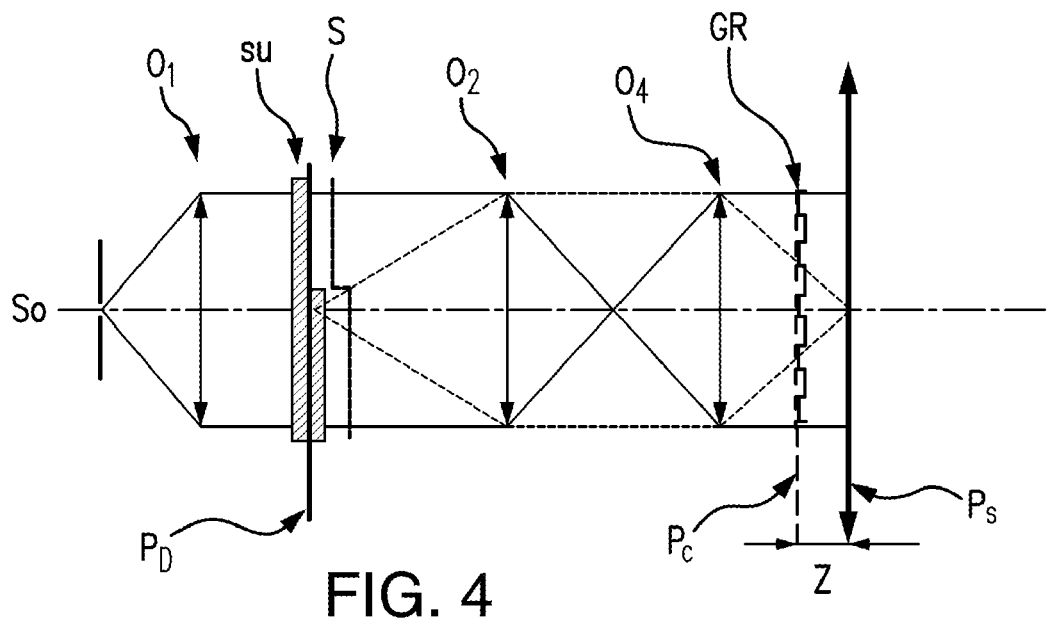
FIG. 4 illustrates an exemplary embodiment of the invention for an application to segmented optics.
Figure 5:
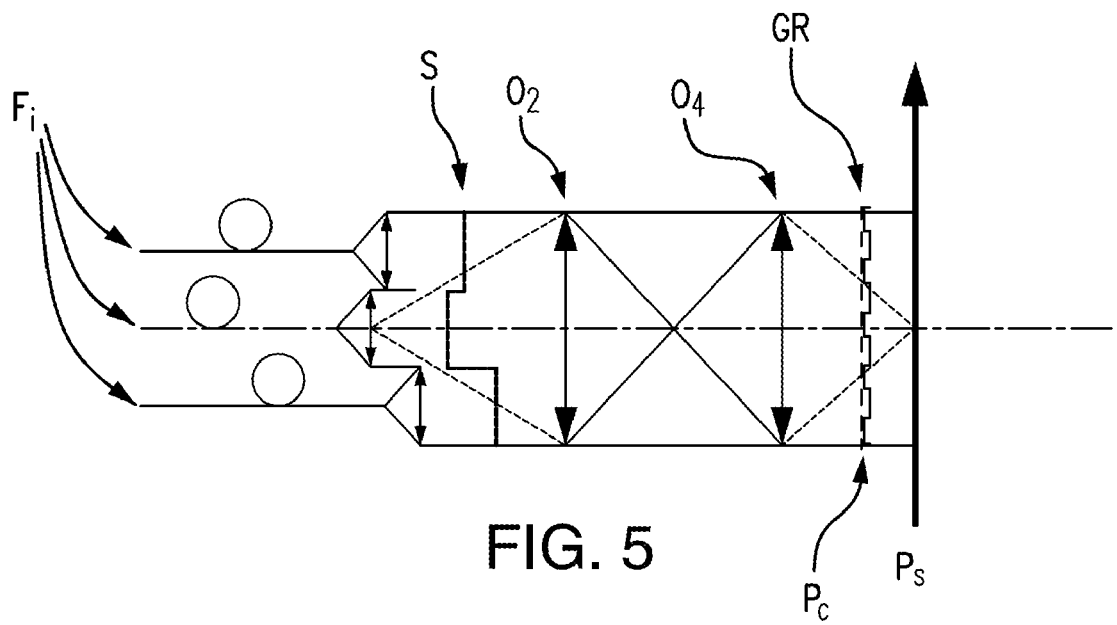
FIG. 5 illustrates an exemplary embodiment of the invention for an application to fibered lasers.
Figure 6:
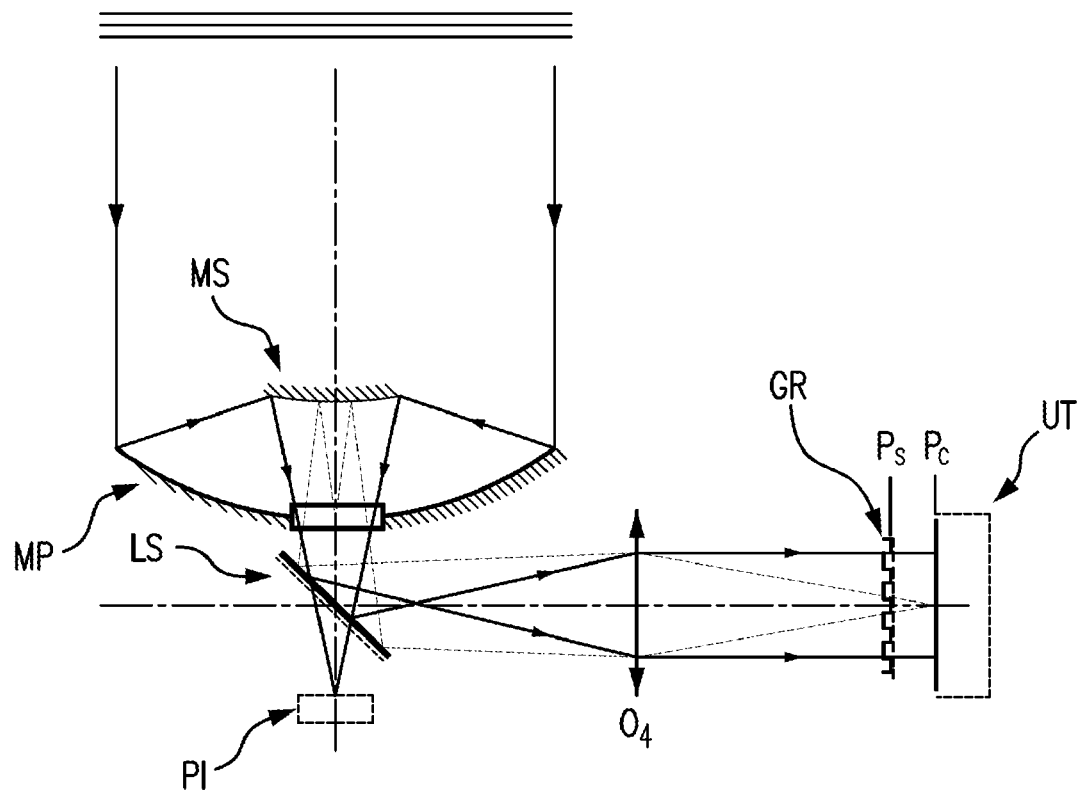
FIG. 6 is the optical principle scheme of a device allowing for implementing the invention for controlling mirrors of segmented telescopes.

Some application examples are illustrated and further explained on FIGS. 4, 5 and 6.

FIG. 4 illustrates an exemplary device for implementing the method. A light source So is arranged upstream a shaping optics $O_1$ shaping a light beam crossing an etched substrate to be analyzed. The light source So is able to provide at least two different colors. This source is, for example, a laser source or a polychromatic source associated with filters. The beam, after crossing the substrate su, crosses an a focal device, $O_2$ and $O_4$. The functions of this device comprise, on the one hand, adapting the diameter of the beam, being analyzed in the plane $P_D$, for the dimensions of the two-dimensional grating positioned in a plane $P_C$, and, on the other hand, optically conjugating the plane $P_D$ where the defect to be analyzed is located preferably with the plane $P_S$. The observation is carried out in the plane $P_S$.

The plane $P_C$ is positioned at a non null distance Z of the plane $P_S$. If the conjugated plane of the plane $P_D$ where the defect to be analyzed is located is not exactly conjugated with the plane $P_S$, the analysis is still possible, but this is a degraded mode as the observed interferogram is no longer deformed exclusively by the increase rate.

It is therefore desirable that the common observation plane ($P_S$) be optically conjugated of the divided wavefront to be analyzed.

Some power lasers are made through the coherent recombination of fibered lasers, but implementing such a recombination is found to be difficult. A suggested solution, as illustrated in FIG. 5, consists in applying the collimated beams of each fibered laser so as to rebuild only one beam. For a consistent recombination to exist, it is required to ensure that all the applied beams have a similar phase state. This invention allows for defining shifts between fibers $F_i$ and the relative phase states of surface S, these shifts being then able to be compensated for with acousto-optical means, for example.

In FIG. 6, a telescope is observing a very distant light object such as a star, for example, and which generates a planar wavefront. The telescope as illustrated here comprises two mirrors: a primary mirror (MP) and a secondary mirror (MS). The primary mirror here comprises several segments that are to be accurately positioned so as to bring them all on the same surface. The light being collected by the primary mirror is supplied, via the secondary mirror, to a semi-reflecting blade (LS). Thus, part of the light, transmitted through LS, is supplied to the imaging part (PI) of the telescope in order to build the image of the observed light object. The second part of the light, reflected by LS, is sent to a lens $O_4$ transforming the diverging light beam into a parallel beam. In the analysis plane $P_C$, a diffraction grating (GR) is positioned. Observing occurs in a plane $P_S$, located in the conjugated plane of the surface of the mirror MP by the lens $O_4$, thus allowing for carrying out the analysis of the position of segments of the mirror MP.

If the planar wavefront is deformed by the crossing in a turbulent medium, the wavefront to be measured will comprise the overlapping, on the one hand, of the wavefront resulting from such deformations and, on the other hand, of the wavefront resulting from the segmented mirror MP.

Figure 7:
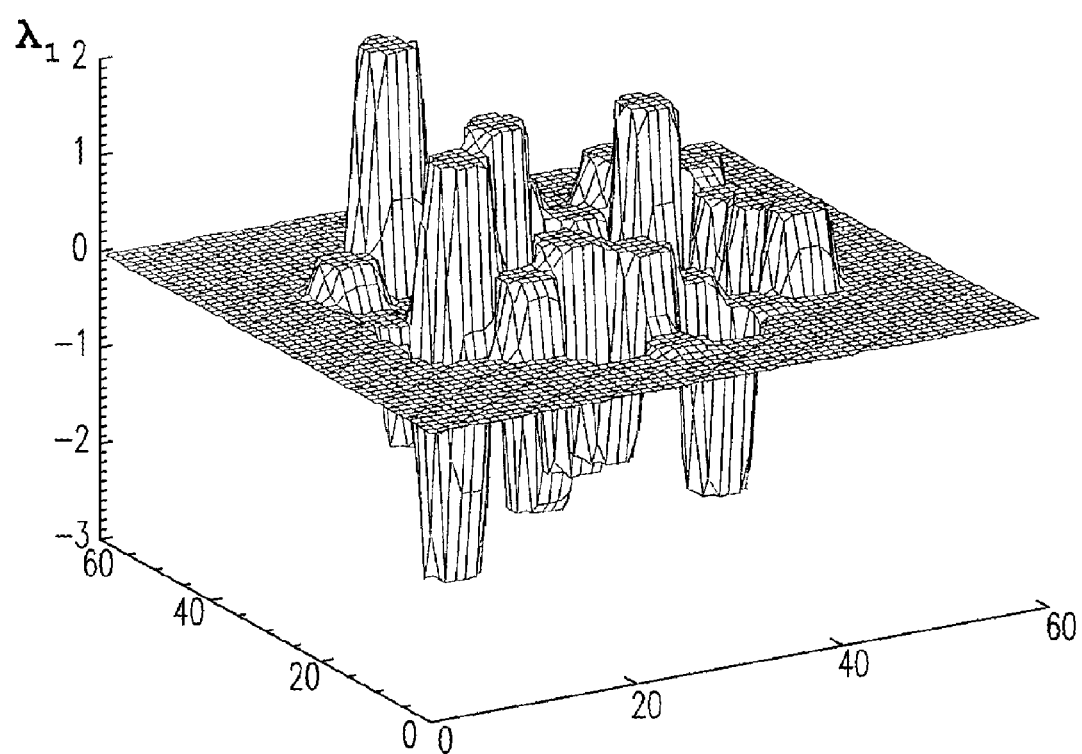
FIG. 7 shows an analysis result obtained on a divided wavefront having numerous height shifts.

FIG. 7 is one example of a result as obtained on a segmented wavefront resulting, for example, from a Keck type segmented primary mirror with 36 segments.

What is claimed is:

1. A method for analyzing the divided wavefront of a light beam having at least two surface parts separated by a difference of level, including:
   (a) positioning a diffraction grating with a two-dimensional meshing in one plane on the path of said beam to cause said beam to be diffracted into different sub-beams due to diffraction orders;
   (b) illuminating said diffraction grating successively by two light beams having said divided wavefront and different colors to observe in observation planes parallel to the plane of said grating at least two interferograms formed by the interferences of at least two sub-beams;
   (c) inducing relative spatial translation between said two interferograms; and
   (d) analyzing said divided wavefront to derive from said divided wavefront the difference of level between said surface parts.

2. A method as defined in claim 1, wherein said inducing step includes demodulating a modulated signal formed by at least one interferogram with respect to a carrier signal formed by an interferogram with another color, thereby to derive said difference of level between said surface parts, and forming a modulating signal by comparing local phases of said interferograms.

3. A method as defined in claim 1, wherein said inducing step includes deriving differences of level between said surface parts in at least two different directions corresponding to two different diffraction orders of said diffraction grating, and combining said differences of level to rebuild said wavefront.

4. A method as defined in claim 1, wherein positioning a diffraction grating includes extracting via said grating three sub-beams, the observation of which in a distant field forms three spots positioned according to an isosceles triangle.

5. A method as defined in claim 1, wherein positioning a diffraction grating includes extracting via said grating four sub-beams, the observation of which in a distant field forms four spots positioned according to a rectangle.

6. A method as defined in claim 1, wherein said observation planes are merged into one common observation plane.

7. A method as defined in claim 6, wherein said common observation plane is optically conjugated with said wavefront to be analyzed.

8. A method as defined in claim 1, wherein said method is used for analyzing said divided wavefront.

* * * * *